(12) United States Patent
Poola et al.

(10) Patent No.: US 11,321,161 B2
(45) Date of Patent: May 3, 2022

(54) SYSTEM FOR RESOLVING HETEROGENOUS DATABASE-LEVEL APPLICATION FAILURES

(71) Applicant: BANK OF AMERICA CORPORATION, Charlotte, NC (US)

(72) Inventors: Ambica Poola, Hyderabad (IN); Praveen Kumar Bolla, Rangareddy (IN); Trishul Vuppalanchi, Secunderabad (IN); Srinath Chakinam, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 5 days.

(21) Appl. No.: 16/785,302

(22) Filed: Feb. 7, 2020

(65) Prior Publication Data

US 2021/0248024 A1 Aug. 12, 2021

(51) Int. Cl.
| | |
|---|---|
| *G06F 11/07* | (2006.01) |
| *G06N 20/00* | (2019.01) |
| *G06F 11/30* | (2006.01) |
| *G06F 16/28* | (2019.01) |
| *G06F 16/22* | (2019.01) |

(52) U.S. Cl.
CPC ........ *G06F 11/079* (2013.01); *G06F 11/0757* (2013.01); *G06F 11/0772* (2013.01); *G06F 11/3006* (2013.01); *G06F 11/3034* (2013.01); *G06F 16/2282* (2019.01); *G06F 16/284* (2019.01); *G06N 20/00* (2019.01)

(58) Field of Classification Search
CPC .... G06F 11/079; G06F 11/3006; G06F 11/30; G06F 11/0757; G06F 11/0772; G06F 11/3034; G06F 16/284; G06F 16/2282; G06N 20/00
See application file for complete search history.

(56) References Cited

U.S. PATENT DOCUMENTS

| | | | |
|---|---|---|---|
| 6,457,143 | B1 | 9/2002 | Yue |
| 7,895,565 | B1 | 2/2011 | Hudgons et al. |
| 8,225,291 | B2 | 7/2012 | Chung |
| 9,495,199 | B2 | 11/2016 | Slinger |
| 9,495,201 | B2 | 11/2016 | Slinger |
| 11,176,464 | B1 * | 11/2021 | Sagi ...................... G06F 11/079 |
| 2011/0283112 | A1 * | 11/2011 | Dettinger .............. G06F 16/284 |
| | | | 713/189 |

(Continued)

*Primary Examiner* — Jonathan D Gibson
(74) *Attorney, Agent, or Firm* — Moore & Van Allen PLLC; James C. Edwards (57) ABSTRACT

Artificial Intelligence/Machine Learning-based performance monitoring of database applications to identify performance issues/bottlenecks that may lead to application failure. In response to identifying the performance issues, AI/ML-based analysis of the database is performed to determine the root cause of the performance issues and resolutions for addressing/overcoming the probable causes. As a result, a comprehensive system that capable of monitoring and determining database related performance issues within database application and capable of determining and implementing the resolution to such performance issues. In addition, an auto-correction feature for errors that may occur during the monitoring of the database applications and related analysis.

18 Claims, 4 Drawing Sheets

(56) References Cited

U.S. PATENT DOCUMENTS

| | | | |
|---|---|---|---|
| 2014/0137131 A1* | 5/2014 | Dheap | G06F 9/5005 |
| | | | 718/104 |
| 2014/0173350 A1* | 6/2014 | Roy | G06F 11/0766 |
| | | | 714/37 |
| 2016/0203036 A1* | 7/2016 | Mezic | G06N 7/005 |
| | | | 714/819 |
| 2016/0342677 A1* | 11/2016 | Nuchia | G06F 16/285 |
| 2017/0097860 A1* | 4/2017 | Pang | G06F 11/0709 |
| 2017/0123889 A1* | 5/2017 | Haridas | G06F 16/21 |
| 2019/0012254 A1* | 1/2019 | Gupta | G06F 11/0706 |
| 2020/0151042 A1* | 5/2020 | Spencer | G06F 11/0787 |
| 2020/0272551 A1* | 8/2020 | Oguchi | G06F 11/0709 |
| 2020/0409780 A1* | 12/2020 | Balasubramanian | |
| | | | G06F 11/3428 |
| 2021/0019209 A1* | 1/2021 | Krishnaswamy | G06F 8/65 |
| 2021/0026722 A1* | 1/2021 | Bhatia | G06N 20/00 |
| 2021/0342212 A1* | 11/2021 | Neumann | G06F 11/079 |

\* cited by examiner

SYSTEM FOR RESOLVING HETEROGENOUS DATABASE-LEVEL APPLICATION FAILURES

FIELD

The present invention relates to a database application maintenance and, more specifically, providing continuous performance analysis of database applications to detect probable application failure and, in response, resolving the performance issues associated with the probable application failures.

BACKGROUND

Large enterprises implement numerous applications in the course of conducting their business. In most instances, these applications are database driven. Such that, if the database does not perform well, then the performance of the application degrades, which in turn may ultimately lead to an application failure.

Therefore, a need exists to develop systems, methods and computer program products and the like that will both continuously monitor database applications within an enterprise to identify performance issues and, in response to detecting performance issues, resolve the performance issues.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for systems, computer-implemented methods, computer program products and the like for monitoring the performance of database and, as a result of the monitoring, resolving database issues affecting the performance. Specifically, the invention provides for using Artificial Intelligence (AI) including Machine Learning (ML) techniques to self-analyze the database application including the associated databases and performance the databases so as to avoid performance bottlenecks and probable application failures. In this regard, the embodiments of the present invention not only analyze the performance but are able to effectively resolve the issues by generating and deploying scripts configure to address issues in the database and, also where applicable, suggest reorganization and/or rebuild of the database and/or database application.

Moreover, the present invention provides for self-learning and auto-correction of errors occurring during the monitoring of the database application, analysis of the database and resolution processing.

A system for database application performance monitoring and issue resolution, defines first embodiments of the invention. The system includes a plurality of database applications with each application associated with one or more databases. The system additionally includes a computing platform including a memory and at least one processing device in communication with the memory. The memory stores a database application evaluation engine. The database application evaluation engine is executable by the one or more processing devices and is configured to analyze, on a continuous basis, a performance of the plurality of database applications using Artificial Intelligence (AI) including Machine Learning (ML) techniques and, in response to analyzing the performance of the plurality of database applications, determine a performance issue with one or more of the database applications. The database application evaluation engine is further configured to, in response to determining the performance issue, analyze the one or more databases associated with the one or more database applications, using AI including ML techniques, to determine a root cause for the performance issue within at least one of the one or more databases. Further, the database application evaluation engine is configured to, in response to determining the root cause for the performance issue, determine a solution for resolving the root cause of the performance issue, and execute the solution for resolving the performance issue related to the database.

In specific embodiments of the system, the database application evaluation engine is further configured to determine the performance issue based on one or more response times for executing database queries exceeding an allowable response time threshold.

In other specific embodiments of the system, the database application engine is further configured to determine the root cause of the performance issue by identifying (i) a column or row within a database table that is approaching a maximum defined length based on a current length of the column or row, and (ii) a rate of growth of the column or the row. In other related embodiments of the system, the database application evaluation engine is further configured to determine the root cause of the performance issue by identifying (i) unused objects or invalid data within at least one of the one or more databases and/or (ii) formatting issues in at least one of the one or more databases.

In still further specific embodiments of the system, the database application evaluation engine is further configured to determine a solution for resolving the root cause of the performance issue by implementing clustering algorithm(s) to identify soft relationships between two or more tables within the at least one of the databases. Soft relationships are tables having related data that are undefined by a key.

In additional specific embodiments of the database application evaluation engine is further configured to determine a solution for resolving the root cause of the performance issue by generating one or more scripts that are configured to be executed in the at least one of the databases. In other specific embodiments of the system, the database application evaluation engine is further configured to determine the solution for resolving the root cause of the performance issue by determining that at least one of the databases would benefit from at least one of a reorganization or a rebuild. In still further specific embodiments of the system, the database application evaluation engine is further configured to determine the solution for resolving the root cause of the performance issue including determining, using AI and ML techniques, a date of probable database application failure based on the root cause of the performance issue.

Moreover, in additional embodiments the system includes an error log engine that is stored in the memory and executable by the one or more processing devices and configured to receive indication of an error resulting from the database application evaluation engine, access a historical error resolution storage to identify a known solution for correcting the error, and execute the known solution to auto-correct the error. In such embodiments of the system, the execution of the known solution to the error triggers resumption of the database application evaluation engine. In related embodiments of the system, the error log engine is further configured to, in response to accessing the historical error resolution storage and being unable to identify a known solution to the error, log the error into a self-learning engine that is configured to analyze the error, using AI and ML techniques, based on historical error data, predetermined rules and application objectives to determine a suggested solution for correcting the error. In such embodiments of the system, the error log engine is further configured to, in response to determining the suggested solution, execute the suggested solution to auto-correct the error.

A computer-implemented method for database application performance monitoring and issue resolution defines second embodiments of the invention. The method executed by one or more computing device processors. The method includes analyzing, on a continuous basis, a performance of a plurality of database applications using Artificial Intelligence (AI) including Machine Learning (ML) techniques and, in response to analyzing the performance of the plurality of database applications, determining a performance issue with one or more of the database applications. The method further includes in response to determining the performance issue, analyzing the one or more databases associated with the one or more database applications using AI including ML techniques to determine a root cause for the performance issue within at least one of the one or more databases. In addition, the method includes, in response to determining the root cause for the performance issue, determining a solution for resolving the root cause of the performance issue, and executing the solution for resolving the performance issue related to the database.

In specific embodiments of the computer-implemented method, determining the performance issue further includes determining the performance issue based on one or more response times for executing database queries exceeding an allowable response time threshold.

In other specific embodiments of the computer-implemented method, determining the root cause of the performance issue further includes determining the root cause of the performance issue by at least one of (i) identifying a column or row within a table within at least one of the one or more databases that is approaching a maximum defined length based on a current length of the column or row and a rate of growth of the column or the row, (ii) identifying unused objects or invalid data within at least one of the one or more databases, and (iii) identifying formatting issues in at least one of the one or more databases.

In other specific embodiments of the computer-implemented method, determining a solution for resolving the root cause further includes implementing clustering algorithms to identify soft relationships between two or more tables within the at least one of the databases, wherein soft relationships are tables having related data that are undefined by a key, and generating one or more scripts that are configured to create keys for the soft relationships within the at least one of the databases.

In further specific embodiments of the computer-implemented method, determining the solution for resolving the root cause of the performance issue further comprises at least one of (i) generating one or more scripts that are configured to be executed in the at least one of the databases, (ii) determining that at least one of the databases would benefit from at least one of a reorganization or a rebuild, and (iii) determining, using AI and ML techniques, a date of probable database application failure based on the root cause of the performance issue.

A computer program product comprising a non-transitory computer-readable medium defines third embodiments of the invention. The computer-readable medium includes a first set of codes for causing a computer processor to analyze, on a continuous basis, a performance of a plurality of database applications using Artificial Intelligence (AI) including Machine Learning (ML) techniques and a second set of codes for causing a computer processor to, in response to analyzing the performance of the plurality of database applications, determine a performance issue with one or more of the database applications. The computer-readable medium additionally includes a third set of codes for causing a computer processor to, in response to determining the performance issue, analyze the one or more databases associated with the one or more database applications using AI including ML techniques to determine a root cause for the performance issue within at least one of the one or more databases. Further, the computer-readable medium includes a fourth set of codes for causing a computer processor to, in response to determining the root cause for the performance issue, determine a solution for resolving the root cause of the performance issue, and a fifth set of codes for causing a computer to execute the solution for resolving the performance issue related to the database.

In specific embodiments of the computer program product, the computer-readable medium further includes a sixth set of codes for causing a computer processor, in response to an error occurring from any one of the first through fifth set of codes, access a historical error resolution storage to identify a known solution for correcting the error, and a seventh set of codes for causing a computer processor to execute the known solution to auto-correct the error. In such embodiments, the execution of the known solution to the error triggers resumption of any one of the first through fifth set of codes. In related embodiments of the computer program product, the computer-readable medium further includes an eighth set of codes for causing a computer processor to, in response to accessing the historical error resolution storage and being unable to identify a known solution to the error, log the error into a self-learning engine that is configured to analyze the error, using AI and ML techniques, based on historical error data, predetermined rules and application objectives to determine a suggested solution for correcting the error. Further, the computer-readable medium includes a ninth set of codes for causing a computer processor to, in response to determining the suggested solution, execute the suggested solution to auto-correct the error.

Thus, according to embodiments of the invention, which will be discussed in greater detail below, the present invention provides for AWL-based performance monitoring of database applications to identify performance issues/bottlenecks that may lead to application failure. In response to identifying the performance issues, AWL-based analysis of the database is performed to determine the root cause of the performance issues and resolutions for addressing/overcoming the probable causes. In this regard, the present invention provides for a comprehensive system that is not only capable of monitoring and determining database related performance issues within database application but is also capable of determining and implementing the resolution to such performance issues. Moreover, the invention is configured to auto-correct errors that may occur during the monitoring of the database applications and related analysis.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatus. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer-implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, for systems, computer-implemented methods, computer program products and the like for monitoring the performance of database and, as a result of the monitoring, resolving database issues affecting the performance. Specifically, the invention provides for using Artificial Intelligence (AI) including Machine Learning (ML) techniques to analyze, on a continuous basis, the performance of database applications to determine performance issues, such as so-called "bottlenecks" in the database application or the like that may lead to application failure. For example, determining that one or more database queries are exceeding allowable time limits for returning data or the like.

In response to determining performance issues, the invention uses AI and ML techniques to analyze the databases to determine the root cause of the performance issue. Determining root cause may include, but is not limited to, determining that a column or row within a database table is approaching maximum limits based on current column/row length and a determined growth rate for the column/row. In additional embodiments of the invention determining root cause may include identifying soft relationships between two or more databases tables, identifying unused objects and/or invalid data, identifying formatting errors and the like.

In response to determining the root causes of the performance issues, resolutions are determined and executed. The resolutions may include creating and executing scripts configured to address the problem causes (e.g., increasing row/column size, keying the soft relationships, deleting unused objects and/or invalid data, reformatting and the like). In addition, the resolutions may include suggesting that the database be reorganized and/or rebuilt to address systemic issues.

Additionally, the present invention provides an auto-error correction feature, in which once an error occurs within the monitoring and resolution portion of the invention, the error is logged and, if the error correlates to a known solution, the known solution is executed and the monitoring and resolution process continues. Additionally, if the error does not correlate to a known solution, the error is logged into an error database for self-learning purposes. Additionally, AI and ML techniques are implemented to analyze the error based on historical error data, predefined error corrections rules and application objects to suggest and, in some embodiments execute, the suggested solution.

Figure 1:
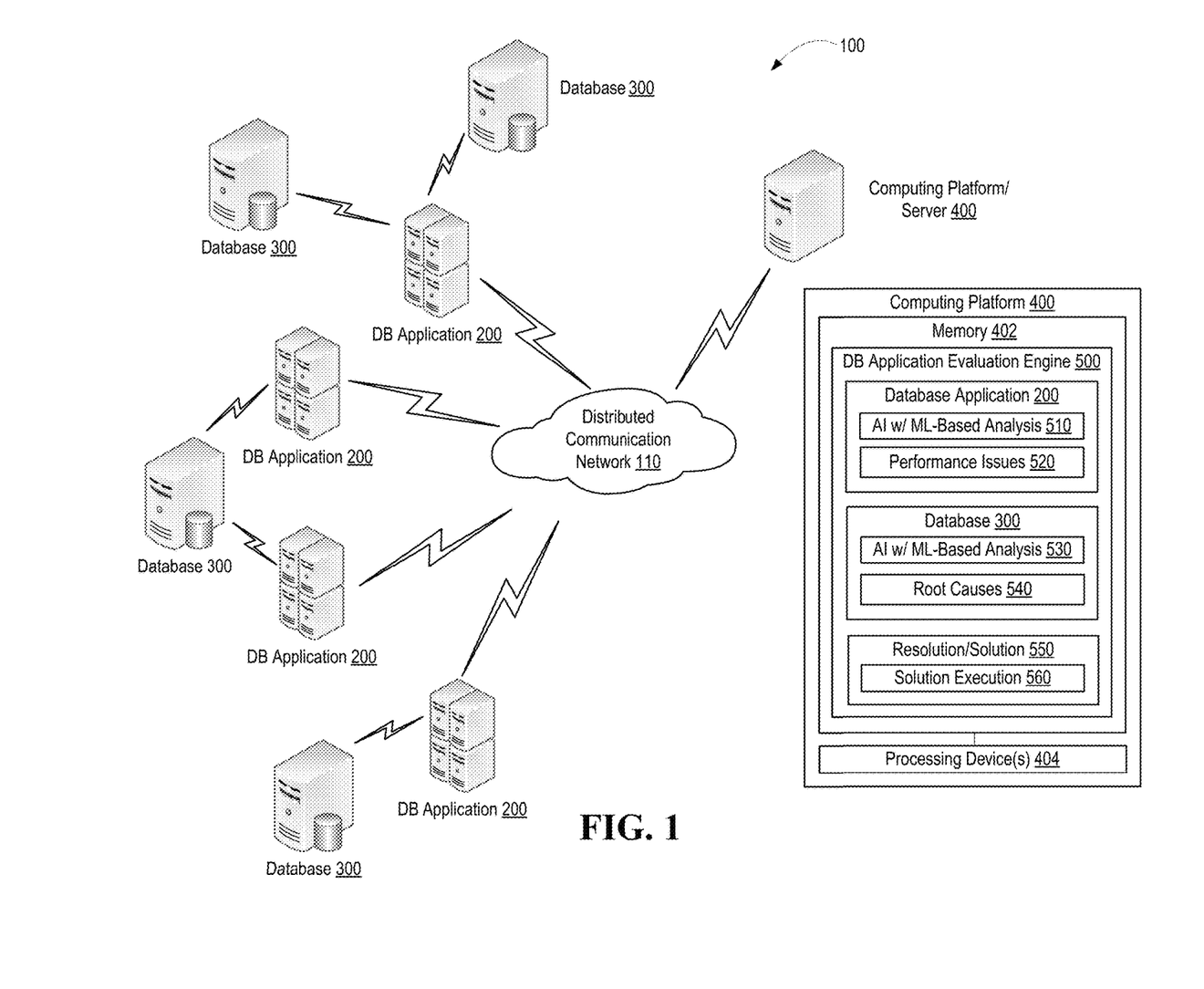
FIG. 1 is a schematic diagram of a system for monitoring the performance of database applications and resolving database-related performance issues, in accordance with embodiments of the present invention.

Referring to FIG. 1, a schematic diagram of a system for monitoring the performance of database applications and resolving database-related performance issues, in accordance with embodiments of the present invention. The system 100 is operated within a distributed communication network 110, which may include one or more intranets and/or the Internet. The system includes a plurality of database applications 200 with each database application associated with one or more databases 300. For example, the plurality of database applications 200 may include all or most of the database applications being executed by a large enterprise or the like. As shown, in FIG. 1 a database application 200 may be associated with a single database 300 or, in other instances, may be associated with more than one database 300. In addition, a database 300 may be mutually exclusive to a single database application 200 or, in other instances, a database 300 may shared by more than one database application 200.

System 100 additionally includes a computing platform 400 having a memory 402 and one or more processing devices 404. Computing platform 400 may be embodied within one or more computing devices, such as servers or the like. The memory 402 of computing platform 400 stores a database application evaluation engine 500, which is executable by the one or more processing devices 404. The database application evaluation engine 500 is configured to perform Artificial Intelligence (AI) including Machine Learning (ML) techniques-based performance analysis 510 on the plurality of database applications 200. The analysis 510 is performed on a continuous basis, e.g., on a daily basis or the like. As a result of the performance analysis 510, the database application evaluation engine 500 is configured to determine performance issues 520 (otherwise referred to as "bottlenecks") with one or more of the database applications. For example, a database application 200 may be experiencing abnormal response times for database queries, data formatting issues or the like.

In response to determining that database application(s) are experiencing performance issues 520, the database application evaluation engine 500 is further configured to perform Artificial Intelligence (AI) including Machine Learning (ML) techniques-based performance analysis 530 on at least one of the one or more databases 300 associated with the database application 200. As a result of the performance analysis 530, the database application evaluation engine 500 is configured to determine one or more root causes 540 for the performance issues 520. As discussed in more detail infra., the root causes may include, but are not limited to, columns/rows of database tables approaching maximum entry limits, unused objects, invalid data, improper formatting and the like.

In response to determining one or more root causes 540, the database application evaluation engine 500 is further configured to, determine a resolution/solution 550 for resolving the probable cause(s) 540 of the performance issues 520 and, where applicable, perform solution execution 560 to resolve within database(s) 300 the root causes 540 of the performance issue 520. For example, according to specific embodiments of the system, the database application evaluation engine 500 generates scripts which are subsequently deployed to that affected databases 300 to resolve the root causes 540 of the performance issues 520.

Figure 2:
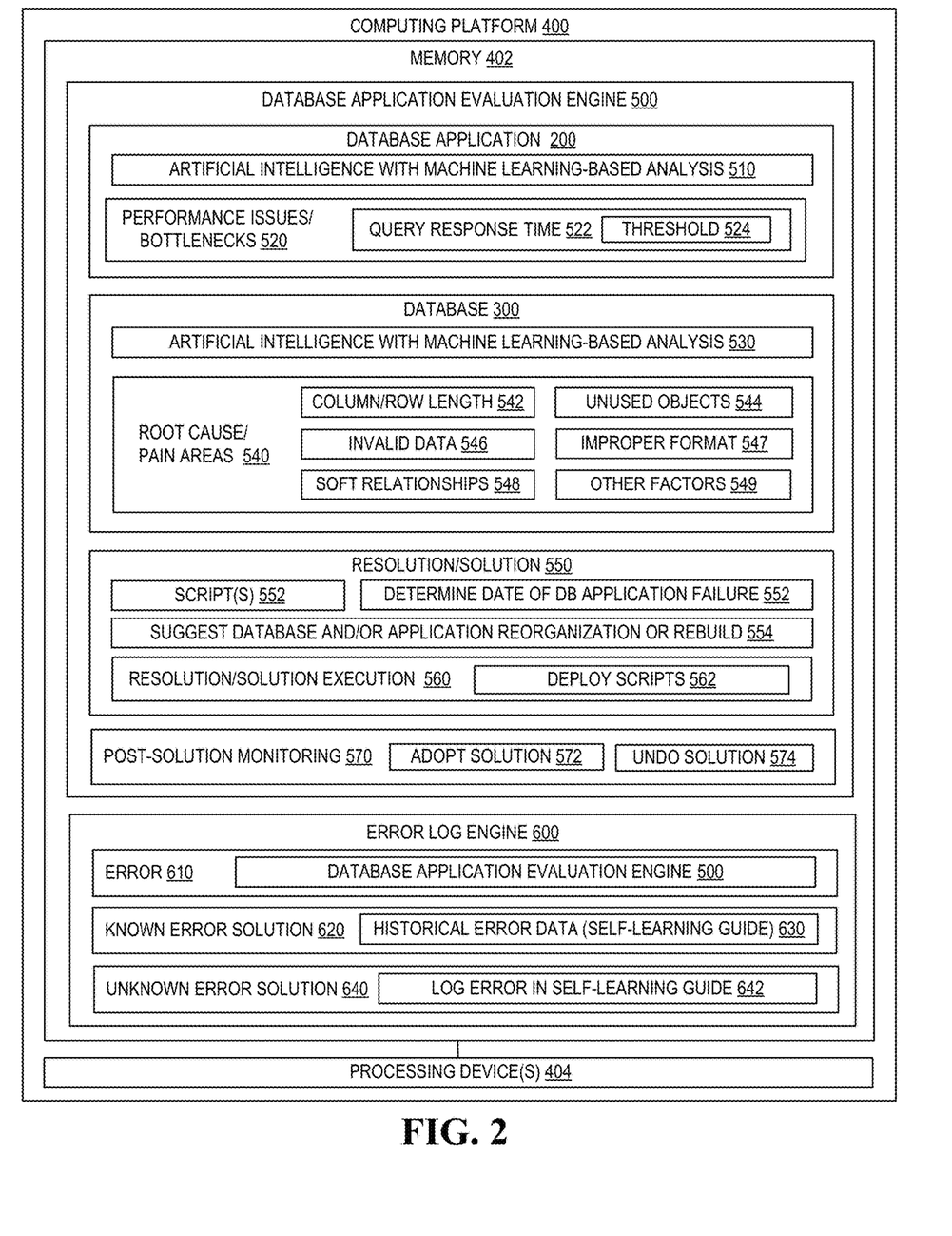
FIG. 2 is a block diagram of computing apparatus configured for monitoring the performance of database applications, resolving database-related performance issues and, error correction, in accordance with some embodiments of the present disclosure.

Referring to FIG. 2, a block diagram of the computing platform 400 for monitoring the performance of database applications, resolving database-related performance issues and, error correction, in accordance with various embodiments of the present invention. In addition to providing greater detail, FIG. 2 highlights various alternative embodiments of the invention. The computing platform 400 may comprise one or typically more computing devices (e.g., servers or the like) and is configured to execute engines, including algorithms, modules, routines, applications and the like. Computing platform 400 includes memory 402 and the like which may comprise volatile and non-volatile memory, such as read-only and/or random-access memory (RAM and ROM), EPROM, EEPROM, flash cards, or any memory common to computing platforms). Moreover, memory 402 and the like may comprise cloud storage, such as provided by a cloud storage service and/or a cloud connection service.

Further, computing platform 400 also includes at least one processing device 404, or the like which may be an application-specific integrated circuit ("ASIC"), or other chipset, logic circuit, or other data processing device configured to implement artificial intelligence including machine learning techniques. Processing device(s) 404 or the like may execute one or more application programming interface (APIs) (not shown in FIG. 2) that interface with any resident programs, such as database application evaluation engine 500, error log engine 600 or the like stored in the memory 402 of the computing platform 400 and any external programs. Processing device(s) 404 may include various processing subsystems (not shown in FIG. 2) embodied in hardware, firmware, software, and combinations thereof, that enable the functionality of the computing platform 402 and the operability of the computing platform 402 on the distributed communications network 110 (shown in FIG. 1). For example, processing subsystems allow for initiating and maintaining communications and exchanging data with other networked devices, such as database applications 200 and associated databases 300 (shown in FIG. 1). For the disclosed aspects, processing subsystems of computing platform 400 may include any processing subsystem used in conjunction with database application evaluation engine 500, error log engine 600 and related engines, tools, routines, sub-routines, algorithms, sub-algorithms, sub-modules thereof.

Computing platform 400 may additionally include a communications module (not shown in FIG. 2) embodied in hardware, firmware, software, and combinations thereof, that enables electronic communications between the computing platform 400 and other network devices, such as, but not limited to, database applications 200 and associated databases 300 300 (shown in FIG. 1). Thus, communication module may include the requisite hardware, firmware, software and/or combinations thereof for establishing and maintaining a network communication connection with one or more network devices.

Memory 402 of computing platform 400 stores database application evaluation engine 500, which is executable by the processing device(s) 404 and configured for monitoring the performance of database applications and resolving database-related performance issues, in accordance with embodiments of the present invention.

As previously discussed, the database application evaluation engine 500 is configured to perform Artificial Intelligence (AI) (including Machine Learning (ML) techniques)-based performance analysis 510 on the plurality of database applications 200. The analysis 510 is performed on a continuous basis, such as, but not limited to, a daily basis or the like. As a result of the performance analysis 510, the database application evaluation engine 500 is configured to determine performance issues 520 (otherwise referred to as "bottlenecks") with one or more of the database applications. Performance issue 520, as used herein, may include any issue with the database application 200 that may or will lead to database application failure. For example, in specific embodiments of the invention, the performance issue is related to a database query response time 522 being abnormal high. In specific embodiments of the invention, the query response time 522 may be compared to a query response threshold 524 and, if the threshold 524 is exceed, a performance issue 520 is identified. Other types of performance issues may be related to the queries returning improperly formatted data, invalid data or the like. The self-learning aspect of the database application evaluation engine 500 provides for the engine 500 to intelligently decide whether the performance issue is on that requires further analysis (i.e., is the performance issue on that will likely result in an application failure and, if so, requires database analysis for root cause and resolution).

The AI and ML techniques used to analyze data within the database application evaluation engine 500 may, in specific embodiments of the invention, rely on extendible hashing. In such approach, data is collected, a choice feature is undertaken and one or more models are chosen for the feature and the models are invoked to make a prediction/determination (i.e., the predicted rule from the invoked models with the highest maximum ballots is applied). The prediction/determination is then applied to train and evaluate the classifier (i.e., the self-learning/machine learning mode in which performance issues and or root causes are identified based on changes made to the models as a result of continuous analysis).

In response to determining that database application(s) are experiencing performance issues 520, the database application evaluation engine 500 is further configured to perform Artificial Intelligence (AI) including Machine Learning (ML) techniques-based performance analysis 530 on at least one of the one or more databases 300 associated with the database application 200. As a result of the performance analysis 530, the database application evaluation engine 500 is configured to determine one or more root causes 540 for the performance issues 520. The root causes may include, but are not limited to, columns/rows of database tables approaching maximum lengths 542, unused objects 544, invalid data 546, improper format 547, soft relationships 548 and other factors 549. Other factors may include, but are not limited to, key columns being unspecified, lack of indexes, memory limitations, table statistics not updated and the like.

In this regard, database application evaluation engine 500 is configured to identify a column or row within a table of a database that is approaching a maximum defined length 542 based on the current length of the column or row and the rate of growth of the column or row (i.e., the rate at which the column or row is receiving data).

Moreover, database application evaluation engine 500 is configured to implement clustering algorithms to identify soft relationships 548 between two or more tables of the database. A soft relationship is defined as tables having related data but are undefined by a key (e.g., primary key or the like). Efficiency in retrieving data from the tables is realized by identifying soft relationship of tables within a given database.

A clustering algorithm is defined as an unsupervised learning method, in which references are drawn datasets comprising input data without labeled responses. As such, the clustering algorithm is used to determine meaningful structure, explanatory underlying processes, generative features and groupings inherent in a set of examples. Specific clustering algorithms, such as the ones used to identify soft relationships, rely on hierarchal-based methods, such as agglomerative (i.e., bottom up approach) or divisive (i.e., top down approach) hierarchal clustering. In such methods, the clusters form a tree type structure based on the hierarchy and new clusters are formed using the previously formed clusters.

In response to determining one or more root causes 540, the database application evaluation engine 500 is further configured to, determine a resolution/solution 550 for resolving the probable cause(s) 540 of the performance issues 520 and, where applicable, perform solution execution 560 to resolve within database(s) 300 the root causes 540 of the performance issue 520. For example, according to specific embodiments of the system, as a means of determining a resolution/solution 550, the database application evaluation engine 500 generates scripts 522 to address root causes (e.g., extend the row/column, delete unused objects, reformat data, identify soft relationships and the like). In addition, the solution/resolution may include determination of a date 552 of probable database application failure. This date is significant in that it provides database administration insight into how soon the scripts are required to deployed to the databases 300. Moreover, in certain instances, in which script generation and deployment is not seen is a viable solution to the problems existing in the database application 200 and/or database 300, the database application evaluation engine 500 is configured to suggest that the database 300 and/or the database application 200 be reorganized and/or rebuilt 554. For example, the database may be experiencing a huge data growth on a day-by-day basis and, thus the indexes require rebuilding and/or reorganization of the database. In this regard, defragmenting the database space at a page level results in available released database storage/space.

Further, as a means of resolution/solution execution 560, database application evaluation engine 500 is configured to deploy the scripts. In further embodiments of the invention, database application evaluation engine 500 is configured to perform post-solution monitoring 570 to determine the effectiveness of the resolution/solution 550. If the post-solution monitoring determines, through intelligent AI-based analysis, that the solution is effective, the database application evaluation engine 500 is configured adopt 572 the resolution/solution. However, if the post-solution monitoring 570 to determines, through intelligent AI-based analysis, that the resolution/solution does not improve the performance or, in some instances worsens the performance, the database application evaluation engine 500 is configured to undo 574 the solution/rollback the changes implemented by the script (i.e., revert the database back to a pre-solution/pre-script version).

In additional embodiments of the invention, the memory 402 of computing platform 400 stores error log engine 600. The error log engine 600 is configured to receive an indication of an error 610 occurring within the database application evaluation engine 500 and access historical error data 630, such as a self-learning guide or the like to determine whether the error has a known error solution 620. If the error 610 has a known error solution 620, the solution 620 is implemented and the database application evaluation engine 500 is configured to resume processing. If the error log engine 600 accesses the historical error data 630 and determines that the error is new (i.e., unknown error solution 640), the error is logged 642 into the self-learning guide. Implementing AWL, the error log engine 600 analyzes the error having the unknown solution based on the historical error data 630, predetermined error resolution rules and application objects and uses the predictive analysis to suggest a solution to the error and, where applicable, automatically resolve the error in accordance with the suggested solution.

Figure 3:
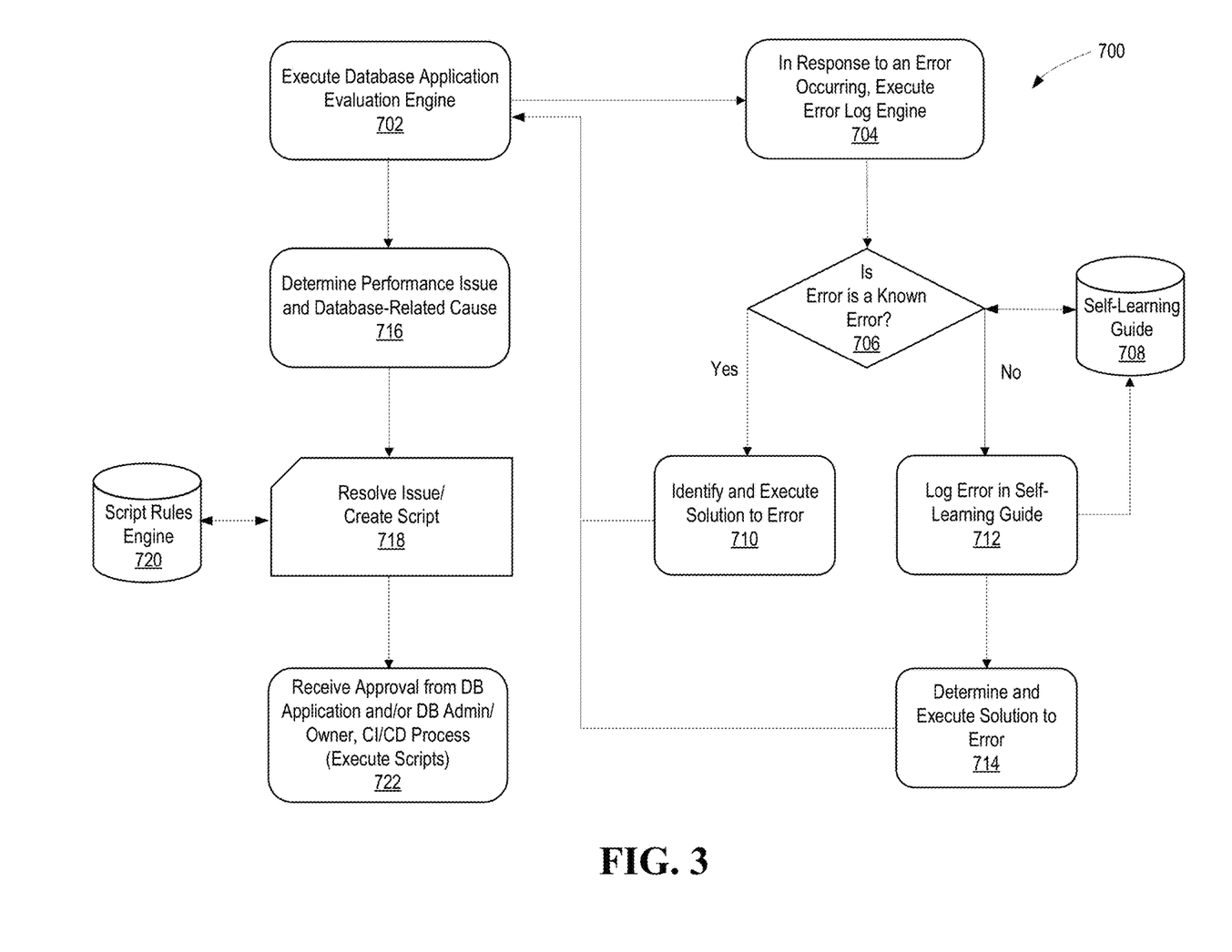
FIG. 3 is a flow diagram of a method for monitoring the performance of database applications, resolving database-related performance issues and, error correction, in accordance with some embodiments of the present disclosure.

Referring to FIG. 3 a flow diagram is depicted of a method 700 for monitoring database application performance, resolving database-related performance issues and error correction, in accordance with embodiments of the present invention. At Event 702, the database application evaluation engine is executed to analyze the database application for performance issues and/or the database for root causes of the performance issues. At Event 704, in response to an error occurring within the database application evaluating engine, the error log engine is executed.

At Decision 706, the error log engine is configured to determine if the error is a known/previously occurring error that has a known solution. In this regard, the error log engine access self-learning guide 708 to determine if the error has occurred previously and has a known solution. If the self-learning guide has a solution, at Event 710, the solution is executed and, if the error resulted in discontinuation of the database application evaluation engine, the engine is authorized to continue process. If the self-learning guide does not have a solution (i.e., the error is a new error not previously encountered), at Event 712, the error is logged in the self-learning guide and, at Event 714, a solution to the error is determined, executed and, if applicable, the database application evaluation engine is authorized to continue processing. Determining the solution to the error includes analyzing the error based on historical data in the self-learning guide, predetermined error correction rules and application objects to predict a suggestive solution to the error. Once the solution has been validated, the solution is automatically executed to resolve the issue in the database application evaluation engine.

Once the issue has been resolved or in the event that an error does not occur, at Event 716, the database application evaluation engine performs intelligent (i.e., AI/ML) analysis to identify performance issues in the database application and root causes of the performance issue in associated database(s). In response to identifying the root causes, at Event 718, solutions to addressing the root causes of the performance issue are identified. Specifically, according to certain embodiments of the invention, scripts are generated. At Event 720, the script rules engine is accessed and script rules specific to the type of database are applied to generate the script. At Event 722, in response to receiving authorization from a database application administrator/owner and/or database administrator/owner, the Continuous Integration (CI)/Continuous Development (CD) process executes/deploys the scripts to the appropriate databases.

Figure 4:
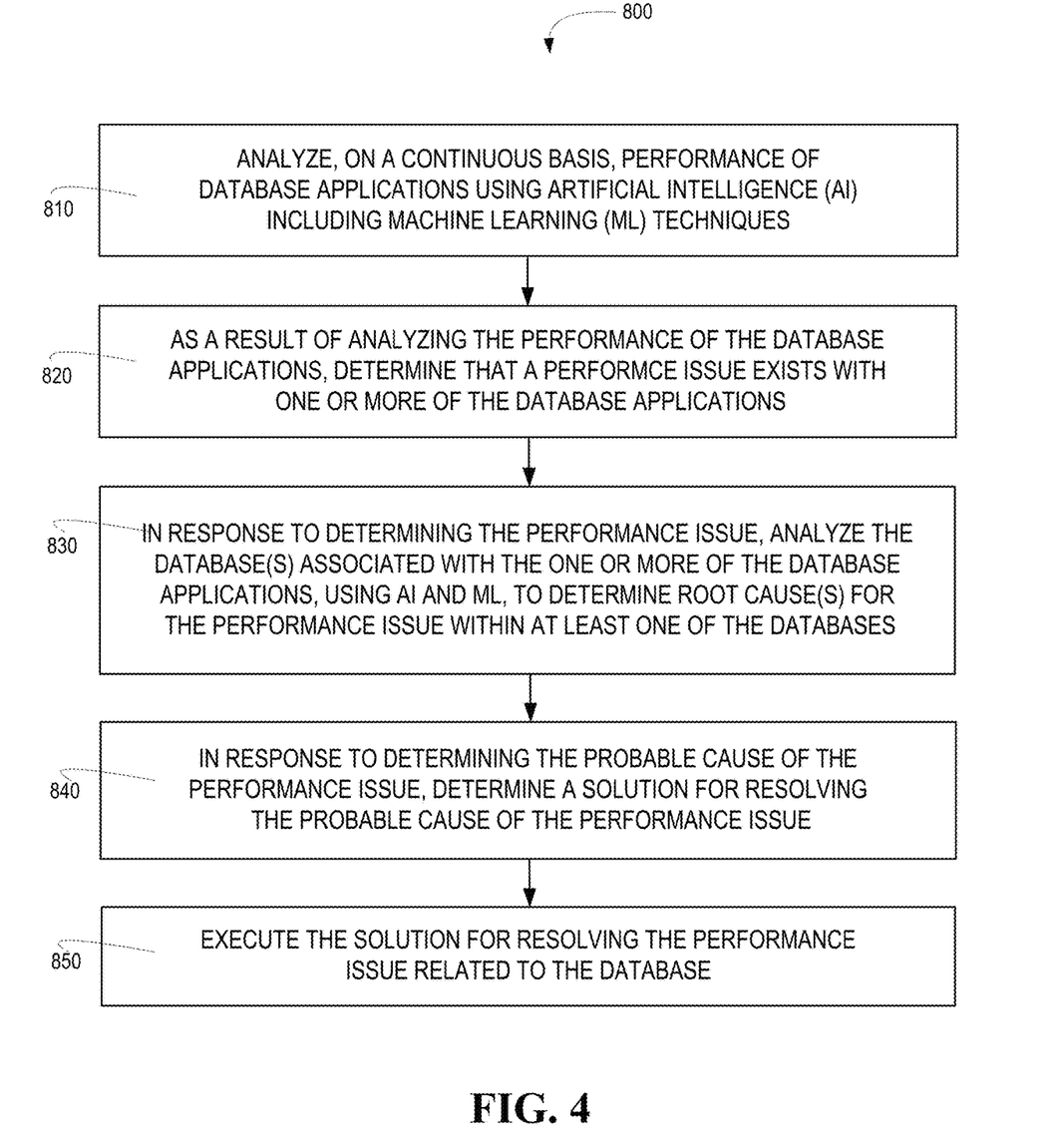
FIG. 4 is a flow diagram of a method for monitoring the performance of database applications and resolving database-related performance issues, in accordance with embodiment of the present invention.

Referring to FIG. 4 a flow diagram is presented of a method 800 for monitoring database application performance and resolving database-related performance issues, in accordance with embodiments of the present invention. At Event 810, AI and ML techniques are implemented to analyze, on a continuous basis, the performance of a plurality of data applications. As a result of analyzing the performance of the database applications, at Event 820, a determination is made that a performance issue/bottleneck exists with one or more of the database applications. In specific embodiments of the invention, the performance issue/bottleneck is related to database query response time, the data being returned from database queries or the like.

In response to determining the performance issue, at Event 830, AI and ML techniques are implemented to analyze, on a continuous basis, the database(s) associated with the database application(s) experiencing performance issues. The databases are analyzed to determine one or more root causes for the performance issue. As previously discussed, the root causes may include, but are not limited to, columns/rows approaching maximum length, unused objects, invalid data, formatting issues, memory limitations, key columns not specified, lack of indexes, table statistics not updated and the like. In addition, the root causes may include unidentified soft relationships between tables of the database. The database analysis is configured to implement clustering algorithms to identify soft relationship (i.e., related data in tables without keys being defined) between tables.

In response to determining root causes, at Event 840, a solution/resolution to the root causes of the performance issue is determined. The solution may include generating scripts to correct/address the specific root causes. In addition, the solution/resolution may determine a date of probable application failure, which assists in determining the scripts should be deployed. Moreover, in certain instances in which the root causes can not be addressed by scripts, the solution/resolution includes suggesting that the database be reorganized and/or rebuilt.

At Event 850, the solution is executed to resolve the performance issue in the database application. In specific embodiments of the invention, execution of the solution includes deployment of the scripts to the database. In further embodiments of the method, once the solution has been executed, the solution is monitored to determine whether the solution is effective in improving and/or eliminating the performance issue. If the monitoring determines that the solution is effective, the solution is adopted and, if the monitoring determines that the solution is ineffective (i.e., does not improve or worsens the performance issue) the solution is undone (i.e., the database is reverted back to a pre-solution state).

Thus, present embodiments of the invention provide the present invention provides for AWL-based performance monitoring of database applications to identify performance issues/bottlenecks that may lead to application failure. In response to identifying the performance issues, AWL-based analysis of the database is performed to determine the root cause of the performance issues and resolutions for addressing/overcoming the probable causes. In this regard, the present invention provides for a comprehensive system that is not only capable of monitoring and determining database related performance issues within database application but is also capable of determining and implementing the resolution to such performance issues. Moreover, the invention is configured to auto-correct errors that may occur during the monitoring of the database applications and related analysis.

The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for database application performance monitoring and issue resolution, the system comprising:
a plurality of database applications, each application associated with one or more databases;
a computing platform including a memory and at least one processing device in communication with the memory, wherein the memory stores a database application evaluation engine, wherein the database application evaluation engine is executable by the one or more processing devices and is configured to:
analyze, on a continuous basis, a performance of the plurality of database applications using Artificial Intelligence (AI) including Machine Learning (ML) techniques;
in response to analyzing the performance of the plurality of database applications, determine a performance issue with one or more of the database applications;
in response to determining the performance issue, analyze the one or more databases associated with the one or more database applications using AI including ML techniques to determine a root cause for the performance issue within at least one of the one or more databases;
in response to determining the root cause for the performance issue, determine a computer platform-implemented solution for resolving the root cause of the performance issue by implementing at least one of agglomerative or divisive hierarchal clustering algorithms to identify soft relationships between two or more tables within the at least one of the one or more databases, wherein soft relationships are tables having related data that are undefined by a key; and
execute the computer platform-implemented solution to resolve the root cause of the performance issue including generating and deploying one or more scripts that are configured to create keys for the identified soft relationships within the at least one of the one or more databases.

2. The system of claim 1, wherein the database application evaluation engine is further configured to determine the performance issue based on one or more response times for executing database queries exceeding an allowable response time threshold.

3. The system of claim 1, wherein the database application engine is further configured to determine the root cause of the performance issue by identifying a column or row within a table within at least one of the one or more databases that is approaching a maximum defined length based on a current length of the column or row and a rate of growth of the column or the row.

4. The system of claim 1, wherein the database application evaluation engine is further configured to determine the root cause of the performance issue by identifying unused objects or invalid data within at least one of the one or more databases.

5. The system of claim 1, wherein the database application evaluation engine is further configured to determine the root cause of the performance issue by identifying formatting issues in at least one of the one or more databases.

6. The system of claim 1, wherein the database application evaluation engine is further configured to determine a computer platform-implemented solution for resolving the root cause of the performance issue by generating one or more scripts that are configured to be executed in the at least one of the databases.

7. The system of claim 1, wherein the database application evaluation engine is further configured to determine the computer platform-implemented solution for resolving the root cause of the performance issue, wherein the computer platform-implemented solution includes determining that at least one of the databases would benefit from at least one of a reorganization or a rebuild.

8. The system of claim 1, wherein the database application evaluation engine is further configured to determine the computer platform-implemented solution for resolving the root cause of the performance issue, wherein the computer platform-implemented solution includes determining, using AI and ML techniques, a date of probable database application failure based on the root cause of the performance issue.

9. The system of claim 1, further comprising an error log engine stored in the memory, executable by the one or more processing devices and configured to:
receive indication of an error resulting from the database application evaluation engine;
access a historical error resolution storage to identify a known computer platform-implemented solution for correcting the error; and
execute the known computer platform-implemented solution to auto-correct the error,
wherein the execution of the known computer platform-implemented solution to the error triggers resumption of the database application evaluation engine.

10. The system of claim 9, wherein the error log engine is further configured to:

in response to accessing the historical error resolution storage and being unable to identify a known computer platform-implemented solution to the error, log the error into a self-learning engine that is configured to analyze the error, using AI and ML techniques, based on historical error data, predetermined rules and application objectives to determine a suggested computer platform-implemented solution for correcting the error.

11. The system of claim 10, wherein the error log engine is further configured to:
in response to determining the suggested computer platform-implemented solution, execute the suggested computer platform-implemented solution to auto-correct the error.

12. A computer-implemented method for database application performance monitoring and issue resolution, the method executed by one or more computing device processors and comprising:
analyzing, on a continuous basis, a performance of a plurality of database applications using Artificial Intelligence (AI) including Machine Learning (ML) techniques;
in response to analyzing the performance of the plurality of database applications, determining a performance issue with one or more of the database applications;
in response to determining the performance issue, analyzing the one or more databases associated with the one or more database applications using AI including ML techniques to determine a root cause for the performance issue within at least one of the one or more databases;
in response to determining the root cause for the performance issue, determining a computer platform-implemented solution for resolving the root cause of the performance issue by implementing at least one of agglomerative or divisive hierarchal clustering algorithms to identify soft relationships between two or more tables within the at least one of the one or more databases, wherein soft relationships are tables having related data that are undefined by a key; and
executing the computer platform-implemented solution to resolve the root cause of the performance issue including generating and deploying one or more scripts that are configured to create keys for the identified soft relationships within the at least one of the one or more databases.

13. The computer-implemented method of claim 12, wherein determining the performance issue further comprises determining the performance issue based on one or more response times for executing database queries exceeding an allowable response time threshold.

14. The computer-implemented method of claim 12, wherein determining the root cause of the performance issue further comprises determining the root cause of the performance issue by at least one of (i) identifying a column or row within a table within at least one of the one or more databases that is approaching a maximum defined length based on a current length of the column or row and a rate of growth of the column or the row, (ii) identifying unused objects or invalid data within at least one of the one or more databases and (iii) identifying formatting issues in at least one of the one or more databases.

15. The computer-implemented method of claim 12, wherein determining a computer platform-implemented solution for resolving the root cause of the performance issue is further comprises determining the computer platform-implemented solution for resolving the root cause of the performance issue by at least one of (i) generating one or more scripts that are configured to be executed in the at least one of the databases, (ii) determining that at least one of the databases would benefit from at least one of a reorganization or a rebuild, and (iii) determining, using AI and ML techniques, a date of probable database application failure based on the root cause of the performance issue.

16. A computer program product comprising a non-transitory computer-readable medium including:
a first set of codes for causing a computer processor to analyze, on a continuous basis, a performance of a plurality of database applications using Artificial Intelligence (AI) including Machine Learning (ML) techniques;
a second set of codes for causing a computer processor to, in response to analyzing the performance of the plurality of database applications, determine a performance issue with one or more of the database applications;
a third set of codes for causing a computer processor to, in response to determining the performance issue, analyze the one or more databases associated with the one or more database applications using AI including ML techniques to determine a root cause for the performance issue within at least one of the one or more databases;
a fourth set of codes for causing a computer processor to, in response to determining the root cause for the performance issue, determine a computer platform-implemented solution for resolving the root cause of the performance issue by implementing at least one of agglomerative or divisive hierarchal clustering algorithms to identify soft relationships between two or more tables within the at least one of the one or more databases, wherein soft relationships are tables having related data that are undefined by a key; and
a fifth set of codes for causing a computer to execute the computer platform-implemented solution to resolve the root cause of the performance issue including generating and deploying one or more scripts that are configured to create keys for the identified soft relationships within the at least one of the one or more databases.

17. The computer program product of claim 16, wherein the computer-readable medium further includes:
a sixth set of codes for causing a computer processor, in response to an error occurring from any one of the first through fifth set of codes, access a historical error resolution storage to identify a known computer platform-implemented solution for correcting the error; and
a seventh set of codes for causing a computer processor to execute the known computer platform-implemented solution to auto-correct the error,
wherein the execution of the known computer platform-implemented solution to the error triggers resumption of any one of the first through fifth set of codes.

18. The computer program product of claim 17, wherein the computer-readable medium further includes:
an eighth set of codes for causing a computer processor to, in response to accessing the historical error resolution storage and being unable to identify a known computer platform-implemented solution to the error, log the error into a self-learning engine that is configured to analyze the error, using AI and ML techniques, based on historical error data, predetermined rules and application objectives to determine a suggested computer platform-implemented solution for correcting the error; and a ninth set of codes for causing a computer processor to, in response to determining the suggested computer platform-implemented solution, execute the suggested computer platform-implemented solution to auto-correct the error.

* * * * *